United States Patent
Weber et al.

(10) Patent No.: US 8,119,723 B2
(45) Date of Patent: Feb. 21, 2012

(54) MOLDING COMPOUNDS WITH REDUCED ANISOTROPY REGARDING IMPACT RESISTANCE

(75) Inventors: Martin Weber, Maikammer (DE); Hans Hönl, Obersülzen (DE); Peter Ittemann, Lampertheim (DE); Werner Haensel, Lingenfeld (DE)

(73) Assignee: Styrolution GmbH (DE)

( * ) Notice: Subject to any disclaimer, the term of this patent is extended or adjusted under 35 U.S.C. 154(b) by 0 days.

(21) Appl. No.: 12/527,628

(22) PCT Filed: Feb. 18, 2008

(86) PCT No.: PCT/EP2008/051918
§ 371 (c)(1),
(2), (4) Date: Aug. 18, 2009

(87) PCT Pub. No.: WO2008/101888
PCT Pub. Date: Aug. 28, 2008

(65) Prior Publication Data
US 2010/0036043 A1  Feb. 11, 2010

(30) Foreign Application Priority Data
Feb. 19, 2007 (EP) ..................................... 07102636

(51) Int. Cl.
*C08L 51/00* (2006.01)
*C08L 51/06* (2006.01)
*C08L 33/12* (2006.01)
*C08L 33/20* (2006.01)
*C08F 290/04* (2006.01)

(52) U.S. Cl. ........ 524/504; 524/514; 525/165; 525/178; 525/70; 525/85; 525/66

(58) Field of Classification Search .................. 524/504, 524/514; 525/165, 178, 70, 85, 66
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,393,210 A | 7/1968 | Speck |
| 4,224,419 A | 9/1980 | Swoboda et al. |
| 4,404,322 A | 9/1983 | Saito et al. |
| 4,537,949 A | 8/1985 | Schmidt et al. |
| 4,540,772 A | 9/1985 | Pipper et al. |
| 4,873,289 A | 10/1989 | Lindner et al. |
| 5,362,783 A | 11/1994 | Eiffler et al. |
| 6,218,467 B1 | 4/2001 | Wicker et al. |
| 6,812,283 B2 | 11/2004 | Duijzings et al. |
| 2006/0036037 A1* | 2/2006 | Weber et al. ................... 525/165 |
| 2007/0161746 A1* | 7/2007 | Weber ............................. 525/66 |
| 2009/0239990 A1* | 9/2009 | Weber et al. ................... 524/504 |

FOREIGN PATENT DOCUMENTS

| | | |
|---|---|---|
| DE | 2244519 | 4/1973 |
| DE | 2826925 A | 1/1980 |
| DE | 3843371 A1 | 7/1990 |
| DE | 4419897 A1 | 12/1994 |
| DE | 10024935 A1 | 11/2001 |
| DE | 10347870 A1 | 5/2005 |
| DE | 102005036981 A1 | 2/2007 |
| EP | 0022200 A1 | 1/1981 |
| EP | 0038094 A2 | 10/1981 |
| EP | 0038582 A2 | 10/1981 |
| EP | 0077038 A2 | 4/1983 |
| EP | 0039524 B1 | 6/1984 |
| EP | 0129195 A2 | 12/1984 |
| EP | 0129196 A2 | 12/1984 |
| EP | 0202214 A2 | 11/1986 |
| EP | 0208187 A2 | 1/1987 |
| EP | 0402528 A2 | 12/1990 |
| EP | 0784080 A1 | 7/1997 |
| EP | 0714941 B1 | 2/1998 |
| EP | 0946644 B1 | 9/2001 |
| WO | WO-0210222 A1 | 2/2002 |
| WO | WO-2005071013 A1 | 8/2005 |

* cited by examiner

*Primary Examiner* — James J Seidleck
*Assistant Examiner* — Deve E Valdez
(74) *Attorney, Agent, or Firm* — Connolly Bove Lodge & Hutz LLP

(57) ABSTRACT

A thermoplastic molding composition, comprising the following amounts of components A, B, C, and D:
a) from 3 to 91.9% by weight of one or more styrene copolymers A,
b) from 3 to 91% by weight of one or more polyamides B,
c) from 5 to 50% by weight of one or more graft polymers C,
d) from 0.1 to 25% by weight of one or more terpolymers D, whose oligomer content is smaller than 3% by weight,
and also, if appropriate, comprising, as further components, a further rubber E, an at least monofunctional anhydride F, fibrous or particulate fillers G, and also further additives H, has markedly reduced anisotropy of impact resistance.

24 Claims, No Drawings

US 8,119,723 B2

MOLDING COMPOUNDS WITH REDUCED ANISOTROPY REGARDING IMPACT RESISTANCE

RELATED APPLICATIONS

This application is a national stage application (under 35 U.S.C. §371) of PCT/EP2008/051918, filed Feb. 18, 2008, which claims benefit of European application 07102636.3, filed Feb. 19, 2007.

BACKGROUND OF THE INVENTION

The present invention relates to thermoplastic molding compositions with improved mechanical properties comprising at least four different components.

The molding compositions comprise one or more styrene copolymers, one or more polyamides, at least one graft rubber, and also at least one terpolymer whose content of oligomers is low.

The molding compositions can, if appropriate, comprise, as additional components, for example, further rubbers, an at least monofunctional anhydride whose molar mass is smaller than 3000 g/mol, and, if appropriate, fibrous or particulate fillers or a mixture of these, and also, if appropriate, further additives.

The present invention further relates to preparation of these thermoplastic molding compositions, and also to the use of the molding compositions for production of moldings, for example for household items, for electronic components, for household equipment, for garden equipment, for medical-technology equipment, and for motor vehicle components.

Various polymer blends composed of styrene copolymers and of polyamides have been known for many years, for example from EP-A 202 214, EP-A 402 528, EP-A 784 080, and DE-A 100 24 935.

EP-A 202 214 discloses thermoplastic compositions to the person skilled in the art which comprise not only a graft polymer component (for example an ABS resin) but also a polyamide component (such as nylon) and a terpolymer (for example composed of the monomers styrene, acrylonitrile, and maleic anhydride).

EP-A 402 528 discloses an impact-resistant thermoplastic mixture which comprises not only a graft polymer (such as ABS) but also a polyamide resin, a terpolymer (for example composed of styrene, of a dicarboxylic anhydride and of maleimide), and also, if appropriate, a further polymer component.

Document EP-A 784 080 describes polymer compositions which comprise at least three components, where component A is a graft polymer, component B is a thermoplastic polyamide, and component C is a terpolymer composed of, for example, styrene, acrylonitrile, and maleic anhydride. The compositions described in EP-A 784 080 can also comprise, as further component, phthalic anhydride.

DE-A 100 24 935 describes polymer blends which have at least four components. The compositions described comprise at least one elastomeric graft polymer component, at least one polyamide, at least one compatibilizer having polar groups, and also at least one vinyl copolymer.

While some of the thermoplastic compositions described in the prior art have high heat resistance, good tensile strain at break, and increased weathering resistance, there is often a high degree of anisotropy in relation to impact resistance of the moldings produced therefrom.

Anisotropy is generally the directional dependency of a physical property. For use in production of moldings that can withstand mechanical load, it is very important that the moldings produced do not have a high degree of impact-resistance anisotropy, since there is generally more than one direction in which mechanical loads can arise.

Binary blends composed of polyamides and of styrene copolymers have very poor toughness, because of the incompatibility between polyamide and SAN (matrix and styrene-acrylonitrile copolymer). It has been previously disclosed that the use of functionalized SAN polymers can significantly increase the toughness of polyamide/styrene copolymer mixtures. Furthermore, these products have interesting properties such as high impact resistance and good flowability and chemicals resistance.

Studies on the "in-situ" compatibilization of the components in styrene copolymer/polyamide mixtures have been disclosed in the literature to the person skilled in the art, for example in the following publications: V. J. Triacca, S. Ziaee, J. W. Barlow, H. Kesskula, D. R. Paul, Polymer 32, 1401 (1991); B. Majundar, H. Keskkula, D. R. Paul, N. G. Harvey, Polymer 35, 4263 (1994); C. W. Lee, S. H. Ryu, H. S. Kim, J. Appl. Polym. Sci., 64, 1595 (1997); R. A. Kudva, H. Kesskula, D. R. Paul, Polymer 39, 2447 (1998); C. Lacasse, B. D. Favis, Adv. Polym. Techn. 18, 255 (1999); R. A. Kudva, H. Kesskula, D. R. Paul, Polymer 41, 239 (2000).

Suitable compatibilizers acting between polyamides and styrene copolymers are especially styrene-acrylonitrile-maleic anhydride terpolymers, styrene-N-phenylmaleimide-maleic anhydride terpolymers, and polymers with methyl methacrylate-maleic anhydride content (see, for example, EP-A 0 946 644).

The amino or carboxy end groups of the polyamides generally react with the functional groups of the co- and terpolymers mentioned, the result being in-situ production of copolymers which provide the improved compatibility between the styrene copolymer phase and the polyamide phase. These polymer mixtures with modified interface are generally termed polymer alloys, as, for example, described by L. A. Utracki, "Polymer Alloys and Blends", Hanser Publishers, Munich Vienna N.Y., 1989.

The styrene copolymer/polyamide PA 6 molding compositions known hitherto are like other polymer blends in having high anisotropy of impact resistance. If, for example, a series of experiments uses test specimens obtained from large components parallel to and, respectively, perpendicularly to the direction of flow, there are sometimes large differences in relation to impact resistance. This mechanical anisotropy can lead to considerable disadvantages in the use of the moldings, e.g. cracks or fractures in the molding.

BRIEF SUMMARY OF THE INVENTION

It is therefore an object of the present invention to provide thermoplastic molding compositions which are based on styrene copolymers and on polyamides and have reduced anisotropy of impact resistance.

Surprisingly, this object can be achieved via provision of a thermoplastic molding composition comprising components A, B, C, and D, and also, if appropriate, further components E, F, G, and H, the entirety of which gives a total of 100% by weight.

The inventive molding composition comprises:
a) from 3 to 91.9% by weight of one or more styrene copolymers A,
b) from 3 to 91% by weight of one or more polyamides B,
c) from 5 to 50% by weight of one or more graft polymers C, d) from 0.1 to 25% by weight of one or more terpolymers D, where these have less than 3% by weight oligomer content, and also e) from 0 to 40% by weight of a further rubber E, f) from 0 to 3% by weight of an at least monofunctional anhydride F whose molar mass is smaller than 3000 g/mol, g) from 0 to 50% by weight of fibrous and/or particulate fillers G, h) from 0 to 40% by weight of further additives H.

It is preferable to provide a molding composition which comprises from 10 to 60% by weight of one or more styrene copolymers A, where this styrene copolymer A is preferably composed of two or more monomers from the group of styrene, acrylonitrile, α-methylstyrene, and methyl methacrylate.

The inventive thermoplastic molding compositions comprise, as first component A, from 3 to 91.9% by weight, in particular from 10 to 60% by weight, preferably from 12 to 50% by weight of at least one styrene copolymer A.

Styrene copolymers are in particular SAN or other rubber-free styrene copolymers. Examples of component A are familiar copolymer matrices, e.g. styrene-acrylonitrile copolymers prepared via bulk polymerization, emulsion polymerization, or solution polymerization. Mixtures of matrices are also suitable, examples being those described in Ullmann's Encyclopedia of Industrial Chemistry (VCH-Verlag, 5th edition, 1992, pp. 633 et seq.).

In a further embodiment of the invention, a molding composition is prepared which comprises one or more styrene copolymers A, where this styrene copolymer A is composed of two or three monomers from the group of styrene, acrylonitrile, and/or alpha-methylstyrene. The copolymer matrix A is preferably prepared from the following components: acrylonitrile and styrene and/or α-methylstyrene, via bulk polymerization, or in the presence of one or more solvents. Preference is given here to copolymers A whose molar masses $M_w$ are from 15 000 to 300 000 g/mol, the molar masses being determined by way of example via light scattering in tetrahydrofuran (GPC with UV detection).

The copolymer matrix A can, for example, comprise:

(Aa) polystyrene-acrylonitrile prepared from, based on (Aa), from 60 to 85% by weight of styrene and from 15 to 40% by weight of acrylonitrile, or (Ab) poly-α-methylstyrene-acrylonitrile, prepared from, based on (Ab), from 60 to 85% by weight of α-methylstyrene and from 15 to 40% by weight of acrylonitrile, or (Ac) a mixture of the copolymer matrix (Aa) and of the copolymer matrix (Ab).

The copolymer matrix A can also be obtained via copolymerization of acrylonitrile, styrene, and α-methylstyrene.

DETAILED DESCRIPTION OF THE INVENTION

The number-average molar mass ($M_n$) of the copolymer matrix A is preferably from 15 000 to 150 000 g/mol (determined by means of GPC using UV detection). The viscosity (VN) of the copolymer matrix A (measured to DIN 53726 at 25° C. in a 0.5% strength by weight solution in DMF) is from 50 to 120 ml/g, for example. The copolymer matrix A can be prepared via bulk polymerization or solution polymerization in, for example, toluene or ethylbenzene by a process such as that described in Kunststoff-Handbuch [Plastics Handbook], Vieweg-Daumiller, volume V, (Polystyrol) [Polystyrene], Carl-Hanser-Verlag, Munich 1969, pages 122 et seq., lines 12 et seq.

The inventive molding composition further comprises from 3 to 91% by weight, preferably from 30 to 80% by weight, in particular from 30 to 60% by weight, of one or more polyamides B, which can be homopolyamides, copolyamides, or a mixture thereof.

The polyamide B here can, for example, be composed of the monomers from the group of: terephthalic acid, adipic acid, hexamethylenediamine, ethylenediamine, phenylenediamine, and/or ε-caprolactam. Further details are given below for component B and its preparation.

In a further embodiment of the invention, a molding composition is prepared which comprises from 5 to 50% by weight, preferably from 10 to 40% by weight, of one or more graft polymers C. This graft polymer C is preferably composed of a graft base and of at least one graft.

The graft polymer C is composed, for example, of two or more monomers from the group of butadiene, styrene, acrylonitrile, alpha-methylstyrene, methyl methacrylate, ethyl acrylate, and/or methylacrylamide. For the explanation of the graft polymer C and of its preparation, reference is made to the description in Ullmann's Encyclopedia of Industrial Chemistry 5th edition, VCH, 1992, pages 633 et seq.

The molding composition preferably comprises from 10 to 40% by weight of one or more graft polymers C, where this graft polymer C is composed of a graft based composed of polybutadiene (or, for example, of a copolymer that comprises butadiene) and of at least one graft. The graft is preferably composed of two or more monomers from the group of styrene, acrylonitrile, alpha-methylstyrene, ethyl acrylate, and/or methylacrylamide. Further details are given below for component C and its preparation.

In a further embodiment of the invention, a molding composition is prepared which comprises from 1 to 25% by weight, in particular from 1 to 15% by weight, of a terpolymer D, where this terpolymer D has less than 4% by weight of oligomer content, in particular less than 3% by weight, and preferably less than 2.5% by weight.

Oligomers here are any of the compounds whose molar mass ($M_w$) is smaller than 10 000 g/mol, and the residual monomers are also counted as oligomers here. Familiar methods can be used to determine this molar mass.

The terpolymer D is often composed of three or more monomers, in particular from the group of styrene, acrylonitrile, alpha-methylstyrene, methyl methacrylate, maleimides, and/or maleic anhydride. In a further embodiment of the invention, the molding composition comprises from 1 to 15% by weight, in particular from 2 to 10% by weight, of a terpolymer D, where this terpolymer D has oligomer content of less than 3% by weight, and where the terpolymer D in essence is composed of the monomers styrene, acrylonitrile, and maleic anhydride or maleimides. Further details are given below for component D and its preparation.

In a further embodiment of the invention, the molding composition comprises one or more additional components E, F, G, and/or H.

The molding composition can, for example, also comprise from 0 to 40% by weight, in particular from 1 to 30% by weight, of further rubbers E, where this further rubber E is, for example, composed of two or more monomers, preferably from the group of butadiene, isoprene, styrene, acrylonitrile, alpha-methylstyrene, methyl methacrylate, butyl acrylate, and/or ethylhexyl acrylate. Functionalized rubbers such as those based on ethene and on $C_3$-$C_8$ olefins can be used as component E.

The further rubber E is preferably composed of monomers of the group of: styrene, acrylonitrile, alpha-methylstyrene, methyl methacrylate, and/or butyl acrylate, or comprises monomers from this group.

In a further embodiment of the invention, a molding composition is prepared which also comprises from 0 to 3% by weight, in particular from 0.1 to 2% by weight, of an at least monofunctional anhydride F whose molar mass is smaller than 3000 g/mol, in particular smaller than 1000 g/mol. Examples of an anhydride F that can be used are the compounds phthalic anhydride, benzoic anhydride, and/or chlorophthalic anhydride.

In a further embodiment of the invention, a molding composition is prepared which also comprises from 0 to 50% by weight, in particular from 5 to 40% by weight, of fibrous and/or particulate fillers G (e.g. talc, kaolin, or mica).

In a further embodiment of the invention, a molding composition is prepared which also comprises from 0 to 40% by weight, in particular from 2 to 30% by weight, of further additives H from the group described at a later stage below (for example stabilizers).

The invention also provides a molding composition which comprises the following components:
a) from 3 to 91.9% by weight of a styrene copolymer A composed of styrene and acrylonitrile,
b) from 3 to 91% by weight of a polyamide B,
c) from 5 to 50% by weight of a graft polymer C composed of
  c1) from 40 to 80% by weight of a graft base composed of an elastomeric polymer C1 based on alkyl acrylates having from 1 to 8 carbon atoms in the alkyl radical, ethylene/propylene, dienes, or siloxanes, and with a glass transition temperature below 0° C.,
  c2) from 20 to 60% by weight of a graft C2 composed of
    c21) from 60 to 90% by weight of styrene or alpha-methylstyrene, and
    c22) from 5 to 40% by weight of at least one unsaturated nitrile C22,
d) from 0.1 to 25% by weight of a terpolymer D with less than 3% by weight of oligomer content (Mw smaller than 10 000 g/mol), composed of the following constituents:
  d1) from 60 to 85% by weight of styrene or alpha-methylstyrene, or a mixture of these, and
  d2) from 15 to 40% by weight of acrylonitrile,
  d3) from 0.1 to 5% by weight, preferably from 0.5 to 4% by weight, of maleic anhydride;
e) from 0 to 40% by weight of further rubbers E,
f) from 0 to 3% by weight of an at least monofunctional anhydride F whose molar mass is smaller than 3000 g/mol;
g) from 0 to 50% by weight of fibrous or particulate fillers G,
h) from 0 to 40% by weight of further additives H.

In a further embodiment of the invention, a molding composition is prepared in which component A is composed of from 60 to 85% by weight of styrene and from 15 to 40% by weight of acrylonitrile.

In a further embodiment of the invention, a molding composition is used which comprises, as component C, a graft rubber, where at least 90% by weight of the particles of the graft base have a diameter of less than 450 nm.

The present invention also provides a process for preparation of the molding compositions described above via mixing of components A to D and, if appropriate, of components E to H. Familiar apparatuses, such as extruders, can be used here.

The invention also provides the use for production of fibers, of foils, and of moldings, of the molding compositions described above. The use also includes the production of household items, of electronic components, of household equipment, of garden equipment, of medical-technology equipment, of motor vehicle components, and of bodywork parts.

The invention further provides moldings, fibers, and foils produced from a molding composition described above.

While the molding compositions comprise, as first component, a styrene copolymer matrix, they preferably comprise as second component, from 3 to 91% by weight, in particular from 30 to 80% by weight, of a thermoplastic polyamide B.

The polyamide comprised as component B in the molding compositions are likewise known. Examples are semicrystalline and amorphous polyamide resins whose molar mass (weight-average) is at least 5000, these usually being termed nylon. These polyamides are described by way of example in the following early U.S. Pat. Nos. 2,071,250; 2,071,251; 2,130,523; 2,130,948; 2,241,322; 2,312,966; 2,512,606, and 3,393,210.

The polyamides B can, for example, be prepared via condensation of equimolar amounts of a saturated or aromatic dicarboxylic acid, for example having from 4 to 12 carbon atoms, with a saturated or aromatic diamine having, for example, from 2 to 14 carbon atoms, or via condensation of ω-aminocarboxylic acids, or via polyaddition of corresponding lactams.

Examples of these polyamides are, inter alia, the following known structures:
polyhexamethyleneadipamide (nylon-6,6),
polyhexamethyleneazelamide (nylon-6,9),
polyhexamethylenesebacamide (nylon-6,10),
polyhexamethylenedodecanediamide (nylon-6,12),
and also the polyamides obtained via ring-opening of lactams, e.g. polycaprolactam, polylaurolactam, poly-11-aminoundecanoic acid, and a polyamide composed of di(p-aminocyclohexyl)methane and dodecanedioic acid.

It is also possible to use polyamides which have been produced via copolycondensation of two or more of the abovementioned polymers or of their components, for example copolymers composed of adipic acid, isophthalic acid, or terephthalic acid and hexamethylenediamine, or copolymers composed of caprolactam, terephthalic acid, and hexamethylenediamine. These semiaromatic copolyamides comprise from 40 to 90% by weight of units which derive from terephthalic acid and from hexamethylenediamine. A small proportion of the terephthalic acid, preferably not more than 10% by weight of the entire aromatic dicarboxylic acid used, can be replaced by isophthalic acid or other aromatic dicarboxylic acids, preferably those in which the carboxy groups are in para-position.

Other monomers that can be used for the polyamide component B are cyclic diamines, such as the compounds of the general formula (V)

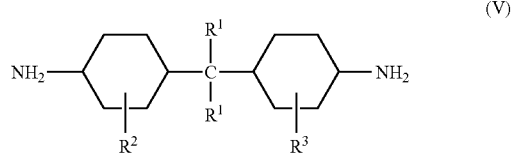

(V)

in which
$R^1$ is hydrogen or a $C_1$-$C_4$-alkyl group, $R^2$ is a $C_1$-$C_4$-alkyl group or hydrogen, and
$R^3$ is a $C_1$-$C_4$-alkyl group or hydrogen.

Particularly preferred diamines (V) are bis(4-aminocyclohexyl)methane, bis(4-amino-3-methylcyclohexyl)methane, 2,2-bis(4-aminocyclohexyl)propane, or 2,2-bis(4-amino-3-methylcyclohexyl)propane.

Other diamines (V) that may be mentioned are 1,3- or 1,4-cyclohexanediamine or isophoronediamine. m-Xylyenediamine is another diamine that may be mentioned.

Other units that can be comprised in the semiaromatic copolyamides, alongside the units that derive from terephthalic acid and from hexamethylenediamine, are those that derive from ε-caprolactam and/or those that derive from adipic acid and from hexamethylenediamine.

The proportion of units that derive from ε-caprolactam is up to 50% by weight, preferably from 20 to 50% by weight, in particular from 25 to 40% by weight, while the proportion of units which derive from adipic acid and from hexamethylenediamine is up to 60% by weight, preferably from 30 to 60% by weight, and in particular from 35 to 55% by weight.

The copolyamides can also comprise not only units from ε-caprolactam but also units from adipic acid and from hexamethylenediamine. In this case, care has to be taken that the proportion of units free from aromatic groups is at least 10% by weight, preferably at least 20% by weight. There is no particular restriction here on the ratio of the units which derive from ε-caprolactam and from adipic acid and from hexamethylenediamine. Polyamides B having from 50 to 80% by weight, in particular from 60 to 75% by weight, of units which derive from terephthalic acid and from hexamethylenediamine, and from 20 to 50% by weight, preferably from 25 to 40% by weight, of units which derive from ε-caprolactam, have proven advantageous for many applications.

The semiaromatic copolyamides can, for example, be prepared by the processes described in EP-A 129 195 and EP-A 129 196.

Further semiaromatic polyamides are those whose content of triamine units, in particular units of dihexamethylenetriamine, is below 0.5% by weight. Preference is given to these semiaromatic polyamides whose triamine contents are 0.3% by weight or less. Preference is given to linear polyamides whose melting point is above 200° C.

Examples of further polyamides are polyhexamethyleneadipamide, polyhexamethylenesebacamide, polycaprolactam, nylon-6/6,T and nylon-6,6/6,T, and also polyamides which comprise cyclic diamines as comonomers. Nylon-9,T is also suitable. The relative viscosity of the polyamides is generally from 2.0 to 5, determined on a 1% strength by weight solution in 96% strength sulfuric acid at 23° C., corresponding to a molecular weight (number-average) of about 15 000 to 45 000. Polyamides whose relative viscosity is from 2.4 to 3.5, in particular from 2.5 to 3.4, are preferably used. Other polyamides that can be used as component B are those obtainable, for example, via condensation of 1,4-diaminobutane with adipic acid at an elevated temperature (nylon-4,6). Preparation processes for polyamides of this structure are described, for example, in EP-A 0 38 094, EP-A 0 38 582, and EP-A 0 39 524.

The proportion of the polyamides B in the inventive molding compositions can be from 3 to 91% by weight, preferably from 30 to 80% by weight, and in particular from 30 to 60% by weight.

According to the invention, it is also possible to use, as polyamide component B, the following polyamides in essence composed of:

$b_1$) from 30 to 44 mol %, preferably from 32 to 40 mol %, and in particular from 32 to 38 mol %, of units which derive from terephthalic acid, $b_2$) from 6 to 20 mol %, preferably from 10 to 18 mol %, and in particular from 12 to 18 mol %, of units which derive from isophthalic acid, $b_3$) from 43 to 49.5 mol %, preferably from 46 to 48.5 mol %, and in particular from 46.3 to 48.2 mol %, of units which derive from hexamethylenediamine, $b_4$) from 0.5 to 7 mol %, preferably from 1.5 to 4 mol %, and in particular from 1.8 to 3.7 mol %, of units which derive from aliphatic cyclic diamines having from 6 to 30, preferably from 13 to 29, and in particular from 13 to 17, carbon atoms $b_5$) from 0 to 4 mol % of further polyamide-forming monomers other than $b_1$) to $b_4$), where the molar percentages of components $b_1$) to $b_5$) give a total of 100%.

The diamine units $b_3$) and $b_4$) are preferably reacted in approximately equimolar amounts with the dicarboxylic acid units $b_1$) and $b_2$).

Suitable monomers $b_4$) are preferably cyclic diamines of the formula

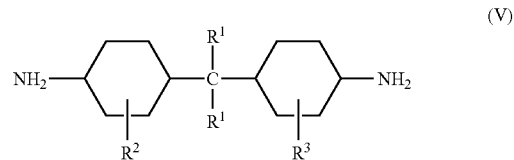

in which
$R^1$ is hydrogen or a $C_1$-$C_4$-alkyl group,
$R^2$ is a $C_1$-$C_4$-alkyl group or hydrogen, and
$R^3$ is a $C_1$-$C_4$-alkyl group or hydrogen.

Examples of preferred diamines $b_4$) are bis(4-aminocyclohexyl)methane, bis(4-amino-3-methylcyclohexyl)methane, 2,2-bis(4-aminocyclohexyl)propane, or 2,2-bis(4-amino-3-methylcyclohexyl)propane. Further monomers $b_4$) that may be mentioned are 1,3- and 1,4-cyclohexanediamine, or isophoronediamine.

The polyamides B can comprise, alongside the units $b_1$) to $b_4$) described above, up to 4% by weight, preferably up to 3.5% by weight, of polyamide-forming monomers $b_5$). Aromatic dicarboxylic acids as component $b_5$) generally have from 8 to 16 carbon atoms. Examples of suitable aromatic dicarboxylic acids are substituted terephthalic and isophthalic acids, e.g. 3-tert-butylisophthalic acid, polynuclear dicarboxylic acids, e.g. 4,4'- and 3,3'-diphenyldicarboxylic acid, 4,4'- and 3,3'-diphenylmethanedicarboxylic acid, 4,4'- and 3,3'-diphenyl sulfone dicarboxylic acid, 1,4- or 2,6-naphthalenedicarboxylic acid, and phenoxyterephthalic acid.

Further polyamide-forming monomers $b_5$) can, for example, derive from dicarboxylic acids having from 4 to 16 carbon atoms and from aliphatic diamines having from 4 to 16 carbon atoms, and also from aminocarboxylic acids and from corresponding lactams having from 7 to 12 carbon atoms. Merely as examples of suitable monomers of this type, mention may be made here of suberic acid, azelaic acid, or sebacic acid as representatives of the aliphatic dicarboxylic acids, 1,4-butanediamine, 1,5-pentanediamine, or piperazine as representatives of the diamines, and caprolactam, caprylolactam, enantholactam, laurolactam, and ω-aminoundecanoic acid as representatives of lactams and aminocarboxylic acids.

The melting points of the polyamides B are preferably above 200° C. and generally in the range from 290 to 340° C., preferably from 292 to 330° C., this melting point being associated with a high glass transition temperature which is generally above 120° C., in particular above 130° C. (in the dry state).

According to the invention, preferred polyamides B are those whose degree of crystallinity is >30%, preferably >35%, and in particular >40%. The degree of crystallinity is a measure of the proportion of crystalline fractions in the copolyamide and is determined via X-ray diffraction or indirectly via measurement of $\Delta H_{crist}$.

It is also possible to use a mixture of various polyamides as component B in the inventive molding compositions, the mixing ratio here being substantially as desired.

Suitable processes for preparation of the polyamides are known to the person skilled in the art.

A preferred preparation method that may be mentioned is the batch process. In this, the aqueous monomer solution is heated in an autoclave within a period of from 0.5 to 3 hours to temperatures of from 280 to 340° C., achieving a pressure of from 10 to 50 bar, in particular from 15 to 40 bar, which is kept as constant as possible for up to 2 hours via release of excess steam. The autoclave is then depressurized at constant temperature within a period of from 0.5 to 2 hours, until a final pressure of from 1 to 5 bar has been achieved. The polymer melt is then discharged, cooled and pelletized. Another process is one based on the processes described in EP-A 129 195 and EP-A 129 196.

The thermoplastic molding compositions comprise, as component C, at least one graft rubber, these graft rubbers preferably making up from 5 to 50% by weight, in particular from 10 to 40% by weight, of the molding compositions. Graft rubbers for the purposes of the invention are core-shell rubbers, which can also have a multishell structure. Preference is given to graft rubbers which, as core (graft base), have a component whose glass transition temperature Tg is below –20° C., preferably below –40° C. Rubbers based on diene, on acrylate, on silicone, and on EPDM are suitable, for example.

The graft shell (graft) is preferably composed of styrene, of acrylonitrile, and/or of other copolymerizable monomers. The hard:soft phase ratio is often from 20.60 to 70:30 parts by weight.

The preparation of these graft rubbers can, for example, be found in DE-A 38 43 371 or DE-22 44 519. EP-A 022 200 has previously disclosed preparation of thermoplastic molding compositions which comprise a copolymer matrix composed of styrene and acrylonitrile, and also comprise a graft copolymer composed of a rubber latex, styrene, and acrylonitrile. A polybutadiene latex is first prepared here via free-radical polymerization using potassium peroxodisulfate as initiator. This rubber latex is then subjected to an agglomeration process, which serves to enlarge the rubber particles. This agglomeration process can, for example, take place via a reaction of the rubber latex with an emulsion of a copolymer composed of ethyl acrylate and methacrylamide. The graft rubber is then prepared via reaction of the agglomerated rubber latex with styrene and acrylonitrile, using an initiator.

The person skilled in the art is also aware that the size of the rubber particles has a substantial effect on the physical properties of the thermoplastic molding compositions. For reasons related to production technology, it can prove advantageous to begin by preparing a rubber latex with small rubber particle size and to use a process of agglomeration in a subsequent step to enlarge the rubber particle size. EP-A 077 038 describes, for example, agglomeration of a dispersed rubber in the presence of a dispersion of a latex comprising acid groups, and also in the presence of a neutral electrolyte. EP-A 714 941 discloses a process for mechanical agglomeration of rubber particles, but it is very expensive to realize on an industrial scale.

The inventive thermoplastic molding compositions comprise a graft polymer C which is preferably based on a rubber latex, in particular on a butadiene latex, and on further monomers available at low cost, in particular acrylonitrile, styrene, and/or methylstyrene.

The inventive molding compositions comprise, for example, not only a copolymer matrix A (in essence composed of acrylonitrile, styrene, and/or α-methylstyrene), but also from 5 to 50% by weight of a graft polymer C, composed of graft base (C1) and of a graft shell (C2).

The invention also provides a process for preparation of a thermoplastic molding composition, by, for example,
a) preparing the thermoplastic copolymer component A via bulk polymerization or solution polymerization,
b) preparing the polyamide component B via polycondensation,
c) preparing the graft copolymer C via, for example, emulsion polymerization with use of an initiator, e.g. of a redox initiator system,
d) preparing the terpolymer D via polymerization, and
e) mixing components A to D, and also, if appropriate, further components E to H.

The graft polymer C is obtainable, for example, from:
(C1): from 55 to 70% by weight, based on the graft copolymer C, of a graft base (C1), obtainable via the reaction of styrene and butadiene and of a copolymerizable, polyfunctional, agglomerating component; and
(C2): from 30 to 45% by weight, based on the graft copolymer C, of a graft shell obtainable via reaction of the graft base (C1) with a mixture of, for example, styrene and acrylonitrile.

The graft copolymer component C has complex structure and is by way of example composed of from 40 to 80% by weight, based on C, of a graft base (C1) and of from 20 to 60% by weight of a graft shell (C2), each of the % by weight values given being based on the total weight of component C.

By way of example, the graft base (C1) can be obtained via reaction of from 0 to 10% by weight of styrene and from 90 to 100% by weight of butadiene, and also from 0.01 to 5% by weight of auxiliary components, the % by weight values given being based on the graft base (C1).

The graft shell (C2) can be obtained via reaction of from 60 to 90% by weight of styrene and from 5 to 40% by weight of acrylonitrile, and also from 0.01 to 5% by weight of auxiliary components (% by weight based on the graft shell C2) in the presence of the graft base (C1).

The thermoplastic molding composition preferably comprises at least one graft polymer C with rubber content of from 20 to 80% by weight. The molding composition can also comprise two or more different graft polymers as component C.

Preparation of the graft polymer C uses by way of example an initiator such as peroxodisulfate or else a redox initiator system, in particular comprising an organic peroxide and also at least one reducing agent.

The organic peroxide used preferably comprises a compound selected from the group of:
di-tert-butyl peroxide, cumene hydroperoxide, tert-butyl hydroperoxide, and p-menthane hydroperoxide, or a mixture thereof. The reducing agents used generally comprise at least one water-soluble compound with reducing action, for example a sugar, such as dextrose.

In one particular embodiment of the invention, for preparation of the graft copolymer C, a redox initiator system is used which comprises an organic peroxide selected from the group of: cumene hydroperoxide, p-menthane hydroperoxide, and mixtures thereof, and a reducing agent is used selected from the group of: salts of sulfinic acid, salts of sulfurous acid, sodium dithionite, sodium sulfite, sodium hyposulfite, sodium hydrogensulfite, ascorbic acid and its salts, Rongalit C (sodium formaldehyde sulfoxylate), mono- and dihydroxyacetone, sugars, ferrous salts, stannous salts, and titanium(III) salts.

For preparation of the graft polymer C it is preferable to carry out an emulsion polymerization using a redox initiator system comprising cumene hydroperoxide, dextrose, and also ferrous salts. It is preferable to use cumene hydroperoxide together with cumene, and the ratio here can preferably be from 20:1 to about 1:10. The cumene hydroperoxide is preferably continuously introduced during the graft polymerization, in particular in the form of a mixture with cumene.

For preparation of the graft base (C1) it is preferable to carry out an emulsion polymerization using potassium peroxodisulfate as initiator.

Examples of suitable preparation processes for the graft copolymers C are emulsion polymerization, solution polymerization, suspension polymerization, or bulk polymerization, and the graft copolymers C here are preferably prepared via aqueous free-radical emulsion polymerization. Suitable polymerization processes are described inter alia in WO-A 2002/10222, DE-A 28 26 925, and EP-A 022 200.

Polymerization of the hard phase often also produces subordinate amounts of ungrafted fractions. These are counted as part of the hard phase. It is also possible to use mixtures of various rubbers (e.g. with various particle size distributions).

The inventive molding compositions also comprise, as a further component, from 0.1 to 25% by weight, preferably from 1 to 25% by weight, of one or more terpolymers D, for example those based preferably on styrene, acrylonitrile, and maleic anhydride.

Suitable terpolymers are described by way of example in EP 784 080 and DE-A 100 24 935. It is also possible to use other terpolymers, such as styrene-N-phenylmaleimide-maleic anhydride terpolymers.

Terpolymers suitable as component D comprise, for example, units $d_1$ which derive from aromatic vinyl compounds (for example styrene). The proportion of the units $d_1$ (based on component D) is often from 20 to 90% by weight, in particular from 40 to 85% by weight, preferably from 60 to 85% by weight. The terpolymers D very particularly preferably comprise from 60 to 75% by weight of $d_1$ units which derive from aromatic vinyl compounds.

Aromatic vinyl compounds that can be used are especially styrene and styrene derivatives. Among the suitable styrene derivatives are α-methylstyrene or styrene derivatives substituted on the aromatic ring, e.g. vinyltoluene, tert-butylstyrene, or chlorostyrene. It is, of course, also possible to use mixtures of different aromatic vinyl compounds. Styrene is very particularly preferably used.

The terpolymers D comprise, alongside the units $d_1$, units $d_3$ which derive from cyclic α,β-unsaturated dicarboxylic anhydrides (such as MA). Their proportion is generally from 0.1 to 5% by weight, in particular from 0.5 to 4% by weight. The proportion of $d_3$ is preferably from 0.6 to 3% by weight. Terpolymers D having less than 0.1% by weight and more than 5% by weight of $d_3$ do not act as compatibilizers. Terpolymers D having substantially less than 0.1% by weight of $d_3$ are also generally not sufficiently thermally stable. Those having substantially more than 5% by weight often become difficult to process, because they are too brittle.

Among the preferred cyclic α,β-unsaturated dicarboxylic anhydrides ($d_3$) are those having from 2 to 20 carbon atoms. The double bond can be either exocyclic or endocyclic. Particular preference among these is given to maleic anhydride, methylmaleic anhydride, or itaconic anhydride, Mixtures of different dicarboxylic anhydrides can likewise be used.

The terpolymers D can moreover also comprise from 0 to 40% by weight, preferably from 5 to 25% by weight, of units $d_2$ which derive from further compounds capable of free-radical polymerization. By Way of example, mention may be made here of acrylic acid and acrylic acid derivatives, such as methacrylic acid, acrylonitrile, methacrylonitrile, alkyl acrylates, such as ethyl acrylate, or ethyl methacrylate. It is preferable to use acrylonitrile as component $d_2$.

The terpolymers D can moreover comprise units $d_4$ which derive, for example, from cyclic α,β-unsaturated dicarboximides. The amount of these generally comprised within the terpolymers D is from 0 to 50% by weight. Preferred terpolymers D comprise from 0 to 49% by weight of $d_4$.

The cyclic α,β-unsaturated dicarboximides of component $d_4$ generally correspond to the abovementioned dicarboxylic anhydrides $d_3$. The substituent on nitrogen is generally a radical such as $C_1$-$C_{20}$-alkyl, $C_4$-$C_{20}$-cycloalkyl, $C_1$-$C_{10}$-alkyl-$C_8$-$C_{18}$-aryl, or a $C_6$-$C_{18}$-aryl radical.

The alkyl radicals can be either linear or branched and can have interruption by one or more oxygen atoms, but the oxygen atoms here do not have direct linkage to the nitrogen atoms and do not have direct linkage to another oxygen atom. Among these alkyl radicals are methyl, ethyl, n-propyl, isopropyl, n-butyl, isobutyl, t-butyl, n-hexyl, n-decyl, and n-dodecyl. The cycloalkyl radicals can be either unsubstituted or substituted radicals. Examples of suitable substituents are alkyl groups, such as methyl or ethyl. Examples that may be mentioned of cycloalkyl radicals are cyclobutyl, cyclopentyl, cyclohexyl, and p-methylcyclohexyl. The alkyl group of the alkylaryl radicals can also have substituents. Examples of these substituents are alkyl groups, such as methyl or ethyl, or else halogen atoms, such as chlorine or bromine. Examples of alkylaryl radicals that can be used are benzyl, ethylphenyl, or p-chlorobenzyl. The aryl radicals can likewise be substituted or unsubstituted radicals, examples of suitable substituents being alkyl groups, such as methyl or ethyl, or halogen atoms, such as chlorine or bromine. Among the preferred aryl radicals are phenyl and naphthyl. Very particularly preferred radicals are cyclohexyl or phenyl.

The terpolymers D comprise the units $d_1$ to $d_4$ in random distribution. The molar masses $M_w$ (weight-average) of the terpolymers D are generally from 30 000 to 500 000 g/mol, preferably from 50 000 to 250 000 g/mol, in particular from 70 000 to 200 000 g/mol.

Example of a method of preparing the terpolymers D uses free-radical polymerization of the appropriate monomers. This reaction can be carried out either in suspension or in emulsion, or else in solution or in bulk, preference being given to the latter. The free-radical reaction can generally be initiated by the usual methods, for example using light, or preferably by free-radical initiators, such as peroxides, e.g. benzoyl peroxide or cumene hydroperoxide.

The terpolymers D can also, as described by way of example in U.S. Pat. No. 4,404,322, be prepared by first reacting components $d_1$, $d_3$, and, if appropriate, $d_2$ with one another in a free-radical reaction, and then to some extent converting the anhydride groups comprised in the reaction product into imide groups, using appropriate primary amines or ammonia. Among the primary amines are not only aliphatic but also aromatic amines. Examples of suitable primary amines are $C_1$-$C_{20}$-alkylamines, $C_4$-$C_{20}$-cycloalkylamines, amino-$C_1$-$C_{10}$-alkylenearyl compounds or $C_6$-$C_{18}$-arylamines. The alkyl radicals of the primary amines can be either linear or branched and can have interruption by one or more oxygen atoms, but the oxygen atoms here do not have direct linkage to the nitrogen atoms and do not have direct linkage to another oxygen atom. Among these alkyl radicals are methyl, ethyl, n-propyl, isopropyl, n-butyl, isobutyl, tert-butyl, n-hexyl, n-decyl, and n-dodecyl. The cycloalkylamines can be either unsubstituted or else substituted compounds. Examples of suitable substituents are alkyl groups, such as methyl or ethyl. Examples that may be mentioned of cycloalkyl radicals are cyclobutyl, cyclopentyl, cyclohexyl, and p-methylcyclohexyl. The alkyl group of the aminoalkylenearyl compounds can be either linear or branched, and the aryl group can also bear substituents. Examples of these substituents are alkyl groups, such as methyl or ethyl, or halogen atoms, such as chlorine or bromine. Examples are aminophenylmethane, 1-amino-2-phenylethane, 1-amino-2-(p-chlorophenyl)ethane. The arylamines can also be substituted or unsubstituted compounds, examples of suitable substituents being alkyl groups, such as methyl or ethyl, or halogen atoms, such as chlorine or bromine. Among the preferred arylamines are aniline and naphthylamines, e.g. 2-aminonaphthalene. Very particular preference is given to cyclohexylamine or aniline.

This reaction is carried out by way of example in the presence of a tertiary amine, such as trialkylamines or dialkylarylamines, e.g. triethylamine or N,N-diethylaniline, as catalyst, at temperatures of from 80 to 350° C.

Other polymers suitable as component D are the MMA/MA copolymers described in EP-A 946 644.

According to the invention, terpolymers used are those which have a low proportion of low-molecular-weight constituents. The low-molecular-weight proportions can be determined by means of GPC. According to the invention, the proportion of material in the molar mass range up to 10 000 g/mol is less than 4% by weight, in particular less than 3% by weight in terpolymers used according to the invention (determined by means of GPC, THF as eluent, UV detector). These terpolymers are preferably prepared via solution polymerization.

The inventive thermoplastic molding compositions can comprise, as further component, a further rubber E or a mixture of rubbers. Rubbers with core-shell structure are suitable. The rubber core here can, for example, be composed of diene (preferably butadiene), of acrylates (preferably n-butyl acrylate, ethylhexyl acrylate), of EPDM rubber, or of siloxane. The proportion of the rubber core is from 40 to 90% by weight. The glass transition temperature of the core is preferably below 0° C. The particle size of this rubber is to be from 0.05 to 10 µm, preferably from 0.1 to 5 µm, and in particular from 0.15 to 3 µm. There may also be reactive groups in the outer shell (epoxy groups or oxazoline groups, acid, anhydride, ester).

Rubbers E used as impact modifier can also be of ethylene copolymer type (Lupolene KR 1270, producer BASF) or of functionalized EP rubber type, or of SEBS block rubber type. The further rubbers E used generally have two substantial features: they comprise an elastomeric fraction whose glass transition temperature is below −10° C., preferably below −30° C., and they comprise at least one functional group which can interact with the polyamide component. Examples of suitable functional groups are carboxylic acid groups, carboxylic anhydride groups, carboxylic ester groups, carboxamide groups, carboximide groups, amino groups, hydroxy groups, epoxy groups, urethane groups, and oxazoline groups.

An example which may be mentioned of rubbers E which increase the toughness of the blends is provided by rubbers composed of ethylene/olefin ($C_3$-$C_8$), preferably of propene, 1-butene, or 1-octene, or else EP rubbers or, respectively, EPDM rubbers grafted with the abovementioned functional groups. Examples of suitable graft reagents are maleic anhydride, itaconic anhydride, acrylic acid, glycidyl acrylate, and glycidyl methacrylate. These monomers can be applied to the polymer by grafting in the melt or in solution, if appropriate in the presence of a free-radical initiator, such as cumenehydroperoxide.

It is moreover also possible to use functionalized SBS or SEBS block copolymers as component E.

Other materials that may be mentioned as rubber component E are copolymers of α-olefins. The α-olefins are usually monomers having from 2 to 8 carbon atoms, preferably ethylene and propylene. Comonomers which have proven suitable are alkyl acrylates or alkyl methacrylates, deriving from alcohols having from 1 to 8 carbon atoms, preferably from ethanol, butanol, or ethylhexanol, and also reactive comonomers, such as acrylic acid, methacrylic acid, maleic acid, maleic anhydride, or glycidyl (meth)acrylate, and moreover vinyl esters, in particular vinyl acetate. Mixtures of various comonomers can likewise be used. Copolymers of ethylene with ethyl or butyl acrylate and acrylic acid and/or maleic anhydride have proven particularly suitable. The copolymers can be prepared in a high-pressure process at a pressure of from 400 to 4500 bar, or via grafting of the comonomers onto the poly-α-olefin. The proportion of the α-olefin in the copolymers is generally in the range from 99.95 to 55% by weight.

A further group that may be mentioned of elastomers suitable as component E is that of core-shell graft rubbers. These are graft rubbers which have been prepared in emulsion and which are composed of at least one hard constituent and of at least one soft constituent. A hard constituent is usually a polymer whose glass transition temperature is at least 25° C., and a soft constituent is usually a polymer whose glass transition temperature is at most 0° C. These products have a structure composed of a core and of at least one shell, and the structure here is the result of the sequence of addition of the monomers. The soft constituents are generally derived from butadiene, from isoprene, from alkyl acrylates, from alkyl methacrylates, or from siloxanes, and, if appropriate, from further comonomers. Suitable siloxane cores can be prepared by way of example from cyclic oligomeric octamethyltetrasiloxane or tetravinyltetramethyltetrasiloxane. These can, for example, be reacted with γ-mercaptopropylmethyldimethoxysilane in a ring-opening cationic polymerization reaction, preferably in the presence of sulfonic acids, to give the soft siloxane cores. The siloxanes can also be crosslinked by, for example, carrying out the polymerization reaction in the presence of silanes having hydrolyzable groups, such as halogen, or alkoxy groups, examples being tetraethoxysilane, methyltrimethoxysilane, or phenyltrimethoxysilane. Examples of suitable comonomers that may be mentioned here are styrene, acrylonitrile, and crosslinking or grafting monomers having more than one polymerizable double bond, e.g. diallyl phthalate, divinylbenzene, butanediol diacrylate, or triallyl(iso)cyanurate. The hard constituents often derive from styrene, and from α-methylstyrene and from their copolymers, and comonomers that may be listed here are preferably acrylonitrile, methacrylonitrile, and methyl methacrylate.

Core-shell graft rubbers preferred as component E comprise a soft core and a hard shell, or a hard core, a first soft shell, and at least one further hard shell. A preferred method here adds suitably functionalized monomers during polymerization of the final shell to incorporate functional groups, such as carbonyl groups, carboxylic acid groups, anhydride groups, amide groups, imide groups, carboxylic ester groups, amino groups, hydroxy groups, epoxy groups, oxazoline groups, urethane groups, urea groups, lactam groups, or halobenzyl groups. Examples of suitable functionalized monomers are maleic acid, maleic anhydride, mono- or diesters of maleic acid, tert-butyl (meth)acrylate, acrylic acid, glycidyl (meth)acrylate, and vinyloxazoline. The proportion of monomers having functional groups is generally from 0.1 to 25% by weight, preferably from 0.25 to 15% by weight, based on the total weight of the core-shell graft rubber. The ratio by weight of soft to hard constituents is generally from 1:9 to 9:1, preferably from 3:7 to 8:2. These rubbers which increase the toughness of polyamides are known per se and are described by way of example in EP-A 208 187.

The molding compositions comprise, if appropriate, as further component, from 0 to 3% by weight of a monofunctional anhydride (F), preferably one whose molar mass is smaller than 3000 g/mol, for example phthalic anhydride. Further examples are described in EP-A 784 080.

The amount of component G comprised within the inventive molding compositions is from 0 to 50% by weight, preferably from 1 to 40% by weight, in particular from 5 to 40% by weight, very particularly from 10 to 20% by weight.

Examples of suitable particulate mineral fillers are amorphous silica, carbonates, such as magnesium carbonate, calcium carbonate, powdered quartz, mica, a very wide variety of silicates, such as clays, muscovite, biotite, suzoite, tin maletite, talc, chlorite, phlogopite, feldspar, calcium silicates, such as wollastonite, or kaolin, particularly calcined kaolin.

In one particularly preferred embodiment, at least 95% by weight, preferably at least 98% by weight, of the particle diameters (largest dimension), determined on the finished product, in the particulate fillers G used, are less than 45 µm, particularly preferably less than 40 µm, and the "aspect ratio" of the particles is preferably in the range from 1 to 25, with preference in the range from 2 to 20, determined on the finished product, i.e. generally on an injection molding.

The particle diameters here can be determined, for example, by taking electron micrographs of thin layers of the polymer mixture and basing the evaluation on at least 25, preferably at least 50, filler particles. Particle diameter can also be determined by way of sedimentation analysis, as in Transactions of ASAE, page 491 (1983). The proportion by weight of the fillers below 40 µm can also be measured by means of sieve analysis. The aspect ratio is the ratio of particle diameter to thickness (largest dimension to smallest dimension).

Particulate fillers G particularly preferred are talc, kaolin, such as calcined kaolin, or wollastonite, or a mixture composed of two or of all of these fillers. Among these, particular preference is given to talc whose proportion of particles with diameter smaller than 40 µm and with aspect ratio of from 1.5 to 25, in each case determined on the finished product, is at least 95% by weight. Kaolin preferably has a proportion of at least 95% by weight of particles whose diameter is smaller than 20 µm and whose aspect ratio is from 1.2 to 20, in each case determined on the finished product. Preference is given, for example, to a finely ground talc (e.g. from the producer Omya International, Switzerland).

Fibrous fillers, such as carbon fibers, potassium titanate whiskers, aramid fibers, or preferably glass fibers, are also used as component G, the length of at least 50% by weight of these fibrous fillers (glass fibers) being more than 50 mm. The diameter of the (glass) fibers used can preferably be up to 25 µm, particularly preferably from 5 to 13 µm. The length of at least 70% by weight of the glass fibers is preferably more than 60 µm. The average length of the glass fibers in the finished molding is particularly preferably from 0.08 to 0.5 mm. The length of the glass fibers relates to a finished molding obtained by way of example after injection molding. The form in which the glass fibers are added here to the molding compositions can be the appropriately cut-to-length form, or can be that of continuous-filament strands (rovings).

Examples of further additives (component H) that may be mentioned are processing aids, stabilizers, oxidation retarders, agents to counter decomposition by heat and decomposition by ultraviolet light, lubricants and mold-release agents, flame retardants, dyes, pigments, and plasticizers. The proportion of component H is generally from 0 to 40% by weight, preferably from 2 to 30% by weight, in particular from 0.2 to 10% by weight, based on the total weight of the composition.

The amounts of pigments and dyes generally comprised are from 0 to 4% by weight, preferably from 0 to 3.4% by weight, and in particular from 0.5 to 3% by weight.

Pigments for the coloring of thermoplastics are well known, see by way of example R. Gächter and H. Müller, Taschenbuch der Kunststoffadditive [Plastics additives handbook], Carl Hanser Verlag, 1983, pp. 494 to 510. A first preferred group of pigments that may be mentioned is that of white pigments, such as zinc oxide, zinc sulfide, white lead (2 $PbCO_3.Pb(OH)_2$), lithopones, antimony white, and titanium dioxide. Among the two most familiar crystalline forms of titanium dioxide (rutile and anatase) it is the rutile form that is particularly used for white coloration of the inventive molding compositions.

Examples of black color pigments that can be used are iron oxide black ($Fe_3O_4$), spinell black ($Cu(Cr, Fe)_2O_4$), manganese black (a mixture composed of managanese dioxide, silicon oxide, and iron oxide), cobalt black, and antimony black, and particularly preferably carbon black, which is mostly used in the form of furnace black or gas black, in which connection see G. Benzing, Pigmente für Anstrichmittel [Pigments for paints], Expert-Verlag (1988), pp. 78 et seq.).

To achieve particular shades it is, of course, possible to use inorganic chromatic pigments, such as chromium oxide green, or organic chromatic pigments, such as azo pigments or phthalocyanines. Pigments of this are widely available commercially. It can also be advantageous to use the pigments or dyes mentioned in a mixture, an example being carbon black with copper phthalocyanines, since this generally eases dispersion of color in the thermoplastic.

Examples of oxidation retarders and heat stabilizers that can be added to the thermoplastic compositions according to the invention are halides of metals of group 1 of the periodic table of the elements, for example sodium halides or lithium halides, if appropriate in conjunction with cuprous halides, for example with chlorides, with bromides, and with iodides. The halides, in particular of copper, can also comprise electron-rich π-ligands. An example that may be mentioned of these copper complexes is provided by Cu halide complexes with, for example, triphenylphosphine. It is also possible to use zinc fluoride and zinc chloride. It is also possible to use sterically hindered phenols, hydroquinones, substituted representatives of this group, secondary aromatic amines, if appropriate in conjunction with phosphorus-containing acids and, respectively, their salts, and mixtures of these compounds, preferably in concentrations of up to 1% by weight, based on the weight of the mixture.

Examples of suitable UV stabilizers are various substituted resorcinols, salicylates, benzotriazoles, and benzophenones, usually used in amounts of up to 2% by weight.

Lubricants and mold-release agents, the amounts added of which are generally up to 1% by weight of the thermoplastic composition, are stearic acid, stearyl alcohol, alkyl stearates, stearamides, and also esters of pentaerythritol with long-chain fatty acids. It is also possible to use stearates of calcium, of zinc, or of aluminum, or else dialkylketones, e.g. distearyl ketone. It is also possible to use ethylene oxide-propylene oxide copolymers as lubricants and mold-release agents.

It is particularly advantageous to use UV and heat stabilizers for polycarbonate and styrene copolymers. Examples of suitable stabilizers are also listed in DE-A 44 19 897. The material can also comprise transesterification inhibitors, such as phosphates, phosphites, or phosphonites.

The inventive thermoplastic molding compositions are prepared by processes known per se, via mixing of the components. It can be advantageous to premix individual components. It is also possible to mix the components in solution, with removal of the solvents. Examples of suitable organic solvents are chlorobenzene, mixtures of chlorobenzene and methylene chloride, or mixtures of chlorobenzene and aromatic hydrocarbons, such as toluene. It is preferable to operate without any chlorine-containing solvents. Vented extruders can by way of example be used for evaporation of solvents from the solvent mixtures.

Any of the known methods can be used for the mixing of the, for example, dry components A to D and, if appropriate, E and F. They are preferably mixed at temperatures of from 200 to 320° C. by extruding, kneading, or rolling the components together, the components here having if appropriate, been previously isolated from the solution obtained during the polymerization reaction or from the aqueous dispersion.

The inventive thermoplastic molding compositions can be processed by the known methods of thermoplastics processing, for example via extrusion, injection molding, calendering, blow molding, or sintering.

The inventive molding compositions can be used for production of foils, of fibers, and of moldings. They can also preferably be used for production of bodywork parts in the automobile sector, in particular for production of automobile parts which have to have demanding mechanical properties, and also of the components mentioned in the introduction.

The invention also provides corresponding moldings, fibers, or foils, and also bodywork parts of motor vehicles, and provides the products described in the introduction.

The sequence in which components A to D and, if appropriate, E to H are mixed, can generally be selected as desired.

The inventive molding compositions can be prepared by processes known per se, such as extrusion. By way of example, the inventive molding compositions can be prepared by mixing the starting components in conventional mixing apparatuses, such as screw extruders, preferably twin-screw extruders, Brabender mixers, or Banbury mixers, or else kneaders, and then extruding them. The extrudate is cooled and comminuted. The sequence of mixing of the components can be varied, and by way of example two or, if appropriate, three components can be premixed, but it is also possible that all of the components are mixed together.

In order to obtain maximum homogeneity of mixing, intimate mixing is advantageous. Average mixing times required for this are generally from 0.2 to 30 minutes at temperatures of from 240 to 300° C., preferably from 245 to 290° C. The extrudate is generally cooled and comminuted.

Surprisingly, a feature of the inventive molding compositions is reduced anisotropy of notched impact resistance.

The examples below illustrate the invention:

EXAMPLES

Polymer Properties

The viscosity number of the polyamides used was determined to DIN 53 727 on 0.5% strength by weight solutions in 96% by weight sulfuric acid.

The viscosity number of the styrene copolymers and of the terpolymers was determined in 0.5% strength by weight DMF solution at 25° C.

The oligomer content of the terpolymers was determined via GP measurement. The eluent used here was THF. A mixedB column set (producer Polymer Laboratories) was used for the separation process. The GPC system was calibrated with polystyrene calibration specimens likewise from Polymer Laboratories, England. The oligomer content here was defined as the content of all of the molecules whose molar mass was below 10 000 g/mol, obtained from the cumulative weight distribution.

The heat resistance of the specimens was determined by means of the Vicat softening point. The Vicat softening point was determined on standard small specimens, to DIN 53 460, using a force of 49.05 N and a temperature rise of 50 K per hour.

The notched impact resistance of the products was determined on ISO specimens to the ISO 179 1eA standard.

To determine the directional dependency of impact resistance, sheets whose dimensions were 150 mm×150 mm×4 mm were produced (melt temperature 250° C., mold temperature 60° C.). ISO specimens were taken perpendicularly to, and parallel to, the gate (film gate).

Flowability was determined to the ISO 1133 standard at 240° C. with a load of 5 kg.

Preparation and Testing of Inventive Molding Compositions a) Preparation of Component A of Inventive Molding Composition Bulk polymerization was used to prepare a styrene-acrylonitrile copolymer having 75% by weight of styrene and 25% by weight of acrylonitrile and a viscosity number of 80 ml/g (determined to DIN 53726 or DIN EN ISO 1628-2 in 0.5% strength by weight DMF solution at 25° C.).

Molar mass (Mn) is about 85 000 g/mol (GPC in THF with PS calibration):

stationary phase: 5-styrene-divinylbenzene gel columns (PL-gel Mixed-B, Polymer Laboratories); THF 1.2 ml/min).

b) Preparation of Component B of Inventive Molding Composition

The polyamide B used comprised a nylon-6 obtained from ε-caprolactam, with a viscosity number of 150 ml/g (measured at 0.5% strength by weight in 96% strength sulfuric acid), e.g. Ultramid B3 (a low-viscosity nylon-6 from the producer BASF Aktiengesellschaft, Ludwigshafen).

c) Preparation of Component C1 of Inventive Molding Composition

Emulsion polymerization using potassium peroxodisulfate as initiator was used to prepare a graft rubber having 62% by weight of polybutadiene as graft base and 38% by weight of a graft composed of 75% by weight of styrene and 25% by weight of acrylonitrile. Average particle size was about 400 nm (measured by means of an ultracentrifuge).

Preparation of Component C2 of Inventive Molding Composition

Emulsion polymerization using potassium peroxodisulfate as initiator was used to prepare a graft rubber having 70% by weight of polybutadiene as graft base and 30% by weight of a graft composed of 75% by weight of styrene and 25% by weight of acrylonitrile. Average particle size was about 370 nm.

Preparation of Component D1 of Inventive Molding Composition

The component D1 used comprised a styrene-acrylonitrile-maleic anhydride terpolymer whose constitution was 74/23.8/2.2 (in each % by weight). The viscosity number was 80 ml/g: the proportion by weight whose molar mass was up to 10 000 g/mol was only 1.7% by weight.

Preparation of Component D2

The component D2 used comprised a styrene-acrylonitrile-maleic anhydride terpolymer whose constitution was 74/23.8/2.2 (in each % by weight). The viscosity number was 80 ml/g: the proportion by weight whose molar mass was up to 10 000 g/mol was only 4.1% by weight.

Use of Component F in Inventive Molding Composition

The component F used comprised phthalic anhydride (as bifunctional, aromatic carboxylic acid derivative; with molar mass of 148 g/mol).

Use of Component G2 in Inventive Molding Composition

The component G2 used comprised talc, e.g. IT Extra talc (producer: Omya).

Preparation of Inventive Molding Compositions

The components described in Table 1 for the inventive compositions (2, 4, 5, and 7) and the comparative compositions (comp.1, comp.3, and comp.6) were mixed in a twin-screw extruder, the melt temperature being from 240 to 260° C.

The melt was then passed through a water bath and pelletized.

The results of the tests are listed in Table 1 below.

TABLE 1

| | Molding composition | | | | | | |
|---|---|---|---|---|---|---|---|
| | comp. 1 | 2 | comp. 3 | 4 | 5 | comp. 6 | 7 |
| A | 19 | 19 | 19 | 19 | 19 | 22 | 22 |
| B | 41 | 41 | 41 | 41 | 41 | 41 | 41 |
| C1 | 35 | 35 | 32 | 32 | 27 | 22 | 22 |
| C2 | — | — | 3 | 3 | 8 | — | — |
| D1 | — | 4.8 | — | 4.8 | 4.8 | — | 4.8 |
| D2 | 4.8 | — | 4.8 | — | — | 4.8 | — |
| F | 0.2 | 0.2 | 0.2 | 0.2 | 0.2 | 0.2 | 0.2 |
| G2 | — | — | — | — | — | 10 | 10 |
| Vicat B [° C.] | 105 | 105 | 104 | 105 | 103 | 109 | 110 |
| MVI [ml/10'] | 5.7 | 5.6 | 7.9 | 8.1 | 6.2 | 4.8 | 4.7 |
| Ak, RT, flow [kJ/m$^2$] | 56 | 55 | 62 | 66 | 71 | 14 | 16 |
| Ak, RT, X-flow [kJ/m$^2$] | 43 | 49 | 44 | 58 | 64 | 8 | 11 |

Surprisingly, the inventive molding compositions have reduced anisotropy with respect to notched impact resistance (kJ/m$^2$), discernible from the difference in Ak values in Table 1.

Even in the case of the molding compositions with which talc was admixed as filler, the reduced anisotropy could be observed when using component D1 (with reduced oligomer content).

The invention claimed is:

1. A thermoplastic molding composition comprising components A, B, C, and D, and optionally the further components E, F, G, and H, the entirety of which gives a total of 100% by weight, where the molding composition comprises:
   a) from 3 to 91.9% by weight of one or more styrene copolymers A,
   b) from 3 to 91% by weight of one or more polyamides B,
   c) from 5 to 50% by weight of one or more graft polymers C,
   d) from 0.1 to 25% by weight of one or more terpolymers D, where these have less than 3% by weight oligomer content based on the weight of terpolymer D, which is the content of all molecules with a weight average molar mass ($M_w$) smaller than 10,000 g/mol,
   e) from 0 to 40% by weight of a further rubber E,
   f) from 0 to 3% by weight of an at least monofunctional anhydride F whose molar mass is smaller than 3000 g/mol,;
   g) from 0 to 50% by weight of fibrous and/or particulate fillers G,
   h) from 0 to 40% by weight of further additives H.

2. The molding composition according to claim 1, wherein said component A is from 10 to 60% by weight, wherein copolymer A is composed of two or more monomers selected from the group consisting of styrene, acrylonitrile, α-methylstyrene, and methyl methacrylate.

3. The molding composition according to claim 1, wherein said component A is from 10 to 80% by weight, and wherein copolymer A is composed of two or three monomers selected from the group consisting of styrene, acrylonitrile, and α-methylstyrene.

4. The molding composition according to claim 1, wherein said component B is from 30 to 80% by weight, and wherein component B is a homopolyamide, copolyamide, or a mixture thereof.

5. The molding composition according to claim 1, wherein said component B is from 30 to 70% by weight, and wherein component B is composed of at least one monomer selected from the group consisting of terephthalic acid, adipic acid, hexamethylenediamine, butanediamine, phenylenediamine, and ε-caprolactam.

6. The molding composition according to claim 1, wherein said component C is from 10 to 40% by weight, wherein said graft polymer C is composed of a graft base and of at least one graft, wherein the graft polymer C is composed of two or more monomers selected from the group consisting of butadiene, styrene, acrylonitrile, alpha-methylstyrene, MMA, butyl acrylate, ethyl acrylate, and methylacrylamide.

7. The molding composition according to claim 1, wherein said component C is from 10 to 40% by weight, wherein said graft polymer C is composed of a graft base composed of polybutadiene and of at least one graft, wherein the graft is composed of two or more monomers selected from the group consisting of styrene, acrylonitrile, alpha-methylstyrene, ethyl acrylate, and methylacrylamide.

8. The molding composition according to claim 1, wherein said component D is from 1 to 15% by weight, and wherein said terpolymer D has less than 3% by weight of oligomer content and is composed of three or more monomers selected from the group consisting of styrene, acrylonitrile, alpha-methylstyrene, methyl methacrylate, maleimide, and maleic anhydride.

9. The molding composition according to claim 1, wherein said component D is from 1 to 15% by weight, wherein said terpolymer D has less than 3% by weight of oligomer content and is composed of the three monomers styrene, acrylonitrile, and maleic anhydride.

10. The molding composition according to claim 1, which further comprises from 1 to 30% by weight of further rubber E, where said rubber E comprises two or more monomers selected from the group of consisting of ethene, propene, butene, and octene.

11. The molding composition according to claim 1, which further comprises from 1 to 30% by weight of at least one further rubber E, wherein said rubber E comprises the monomers ethene, propene, or 1-butene or a mixture thereof.

12. The molding composition according to claim 1, which further comprises from 0.1 to 2% by weight of an at least monofunctional anhydride F whose molar mass is smaller than 3,000 g/mol.

13. The molding composition according to claim 1, which further comprises from 5 to 40% by weight of fibrous and/or particulate fillers G.

14. The molding composition according to claim 1, which further comprises from 2 to 30% by weight of further additives H from the group of the stabilizers and pigments.

15. The molding composition according to claim 1, which comprises
   a) from 3 to 91.9% by weight of a styrene copolymer A composed of styrene and acrylonitrile,
   b) from 3 to 91% by weight of a polyamide B,
   c) from 5 to 50% by weight of a graft polymer C composed of
      c1) from 40 to 80% by weight based on weight of graft polymer C of a graft base composed of an elastomeric polymer C1 based on alkyl acrylates having from 1 to 8 carbon atoms in the alkyl radical, ethylene/propylene, dienes, or siloxanes, and with a glass transition temperature below 0° C.,
      c2) from 20 to 60% by weight based on weight of graft C2 of a graft C2 composed of
         c21) from 60 to 90% by weight based on weight of graft C2 of styrene or alpha-methylstyrene, and
         c22) from 5 to 40% by weight of at least one unsaturated nitrile C22,
   d) from 0.1 to 25% by weight of a terpolymer D with less than 3% by weight of oligomer content, which is the content of all molecules with a weight average molar mass ($M_w$) smaller than 10,000 g/mol, composed of the following constituents:
      d1) from 60 to 85% by weight based on weight of terpolymer D of styrene or alpha-methylstyrene, or a mixture of these, and
      d2) from 15 to 40% by weight based on weight of terpolymer D of acrylonitrile,
      d3) from 0.1 to 5% by weight based on weight of terpolymer D of maleic anhydride;
   e) from 0 to 40% by weight of further rubbers E,
   f) from 0 to 3% by weight of an at least monofunctional anhydride F whose molar mass is smaller than 3000 g/mol;
   g) from 0 to 50% by weight of fibrous or particulate fillers G, and
   h) from 0 to 40% by weight of further additives H.

16. The molding composition according to claim 1, wherein component C comprises graft base with particles and at least 90% by weight of the particles of the graft base have a diameter of less than 450 nm.

17. A process for preparation of molding compositions according to claim 1 which comprises mixing of components A to D and optionally components E to H.

18. A method of use of molding compositions according to claim 1 for production of fibers, of foils, and of moldings by theromplastics processing.

19. The method of according to claim 18 wherein the fibers, foils and moldings are selected from household items, of electronic components, of household equipment, of garden equipment, of medical-technology equipment, of motor vehicle components, and of bodywork parts.

20. A molding, a fiber, or a foil composed of a molding composition according to claim 1.

21. An article which comprises the molding composition according to claim 1, wherein said article is a household item, an electronic component, a household equipment, a garden equipment, a medical-technology equipment, a motor vehicle component, or a bodywork part.

22. The method of according to claim 18, wherein the thermoplastics processing is selected from extrusion, injection molding, calending, blow molding and sintering.

23. The molding composition according to claim 15, wherein said component A is from 12 to 50% by weight, wherein copolymer A is composed of two or more monomers selected from the group consisting of styrene, acrylonitrile, α-methylstyrene, and methyl methacrylate,
   B is from 30 to 70% by weight, and wherein component B is composed of at least one monomer selected from the group consisting of terephthalic acid, adipic acid, hexamethylenediamine, butanediamine, phenylenediamine, and c-caprolactam and said graft polymer C is composed of a graft base and of at least one graft, wherein the graft polymer C is composed of two or more monomers selected from the group consisting of butadiene, styrene, acrylonitrile, alpha-methylstyrene, MMA, butyl acrylate, ethyl acrylate, and methylacrylamide
   from 0.1 to 25% by weight of a terpolymer D with 1.7% by weight or less of oligomer content, which is the content of all molecules with a weight average molar mass ($M_w$) smaller than 10,000 g/mol, composed of the following constituents:
      d1) from 60 to 85% by weight based on weight of terpolymer D of styrene or alpha-methylstyrene, or a mixture of these, and
      d2) from 15 to 40% by weight based on weight of terpolymer D of acrylonitrile,
      d3) from 0.1 to 5% by weight based on weight of terpolymer D of maleic anhydride.

24. The molding composition according to claim 23, wherein the composition comprises
   12 to 22% by weight component A,
   41% by weight component B,
   22 to 35% by weight component C and
   4.8% by weight component D.

* * * * *